(12) United States Patent
Sindlinger et al.

(10) Patent No.: US 10,416,678 B2
(45) Date of Patent: Sep. 17, 2019

(54) RECHARGING AN AIRCRAFT IN A REGION USING AREAS OF INCREASED SUNLIGHT WITHIN THE REGION

(71) Applicant: The Boeing Company, Chicago, IL (US)

(72) Inventors: Andreas Sindlinger, Neu-Isenburg (DE); Nils Kneuper, Neu-Isenburg (DE); Ralf Rene Shu-Zhong Cabos, Braunschweig (DE)

(73) Assignee: The Boeing Company, Chicago, IL (US)

(*) Notice: Subject to any disclaimer, the term of this patent is extended or adjusted under 35 U.S.C. 154(b) by 1 day.

(21) Appl. No.: 15/815,703

(22) Filed: Nov. 16, 2017

(65) Prior Publication Data
US 2019/0146512 A1  May 16, 2019

(51) Int. Cl.
*G05D 1/02* (2006.01)
*G01W 1/10* (2006.01)
*H02J 7/35* (2006.01)

(52) U.S. Cl.
CPC ............ *G05D 1/0217* (2013.01); *G01W 1/10* (2013.01); *G05D 1/0278* (2013.01); *H02J 7/35* (2013.01)

(58) Field of Classification Search
CPC ..... G05D 1/0217; G05D 1/0278; G01W 1/10; H02J 7/35; B64C 2201/042; B64C 2201/066; B64C 2201/141; B64C 2201/145
See application file for complete search history.

(56) References Cited

U.S. PATENT DOCUMENTS

| | | | |
|---|---|---|---|
| 8,359,128 B1* | 1/2013 | Segal | B64C 39/024 701/3 |
| 9,334,052 B2 | 5/2016 | Pasko et al. | |
| 9,959,771 B1* | 5/2018 | Carlson | G08G 5/0039 |
| 10,095,242 B1* | 10/2018 | Von Novak | G05D 1/0808 |
| 2005/0242232 A1 | 3/2005 | Bennett | |
| 2008/0140318 A1 | 6/2008 | Breed | |
| 2009/0292407 A1 | 11/2009 | Minelli et al. | |
| 2013/0013486 A1* | 1/2013 | Bing | G01W 1/10 705/37 |
| 2015/0021442 A1 | 1/2015 | Hunter | |
| 2015/0336671 A1 | 11/2015 | Winn et al. | |
| 2016/0009402 A1 | 1/2016 | Hunter | |
| 2018/0292817 A1* | 10/2018 | Yang | B64F 1/06 |

OTHER PUBLICATIONS

The Netherlands Patent Office, Search Report and Written Opinion and English translation, dated Feb. 20, 2018, regarding Application No. NL2020099, 11 pages.
Extended European Search Report, dated Dec. 4, 2018, regarding Application No. 18189190.4, 10 pages.

* cited by examiner

*Primary Examiner* — Michael J Zanelli
(74) *Attorney, Agent, or Firm* — Yee & Associates, P.C.

(57) ABSTRACT

A system is presented. The system comprises sunlight sensors and GPS receivers in a region, an aerial vehicle, a solar panel, and a flight plan generator. The aerial vehicle is within the region. The aerial vehicle has a rechargeable battery. The solar panel is physically connected to the aerial vehicle and operably connected to the rechargeable battery. The flight plan generator is configured to create a flight plan within the region for the aerial vehicle based on measurements from the sunlight sensors within the region.

29 Claims, 6 Drawing Sheets

RECHARGING AN AIRCRAFT IN A REGION USING AREAS OF INCREASED SUNLIGHT WITHIN THE REGION

BACKGROUND INFORMATION

1. Field

The present disclosure relates generally to recharging an aircraft within a region and, more specifically, to flying an aircraft according to a flight plan created to harness sunlight within the region.

2. Background

Batteries are used to power unmanned aerial vehicles. Flight times and flight distances for unmanned aerial vehicles are affected by battery life. Increasing battery capacity increases available power, but also increases the weight of the unmanned aerial vehicle.

Solar panels may be implemented on aerial vehicles, including unmanned aerial vehicles. Solar panels may be used to recharge batteries present on aerial vehicles. It is desirable to maximize the power provided by the solar panels to batteries of an unmanned aerial vehicles. Therefore, it would be desirable to have a method and apparatus that take into account at least some of the issues discussed above, as well as other possible issues.

SUMMARY

An illustrative embodiment of the present disclosure provides a system. The system comprises sunlight sensors and GPS receivers within the region, the aerial vehicle, a solar panel, and a flight plan generator. The aerial vehicle is within the region. The aerial vehicle has a rechargeable battery. The solar panel is physically connected to the aerial vehicle and operably connected to the rechargeable battery. The flight plan generator is configured to create a flight plan within the region for the aerial vehicle based on measurements from the sunlight sensors within the region.

Another illustrative embodiment of the present disclosure provides a method. Measurements are collected using sunlight sensors in a region. A flight plan within the region is planned for an aerial vehicle based on the measurements.

A further illustrative embodiment of the present disclosure provides a method. An aerial vehicle having a rechargeable battery and a solar panel is flown. The solar panel is operably connected to the rechargeable battery. Sunlight intensities at a first time are measured using the solar panel. A three-dimensional sunlight prediction map for a region at a second time is created based on the sunlight intensities.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
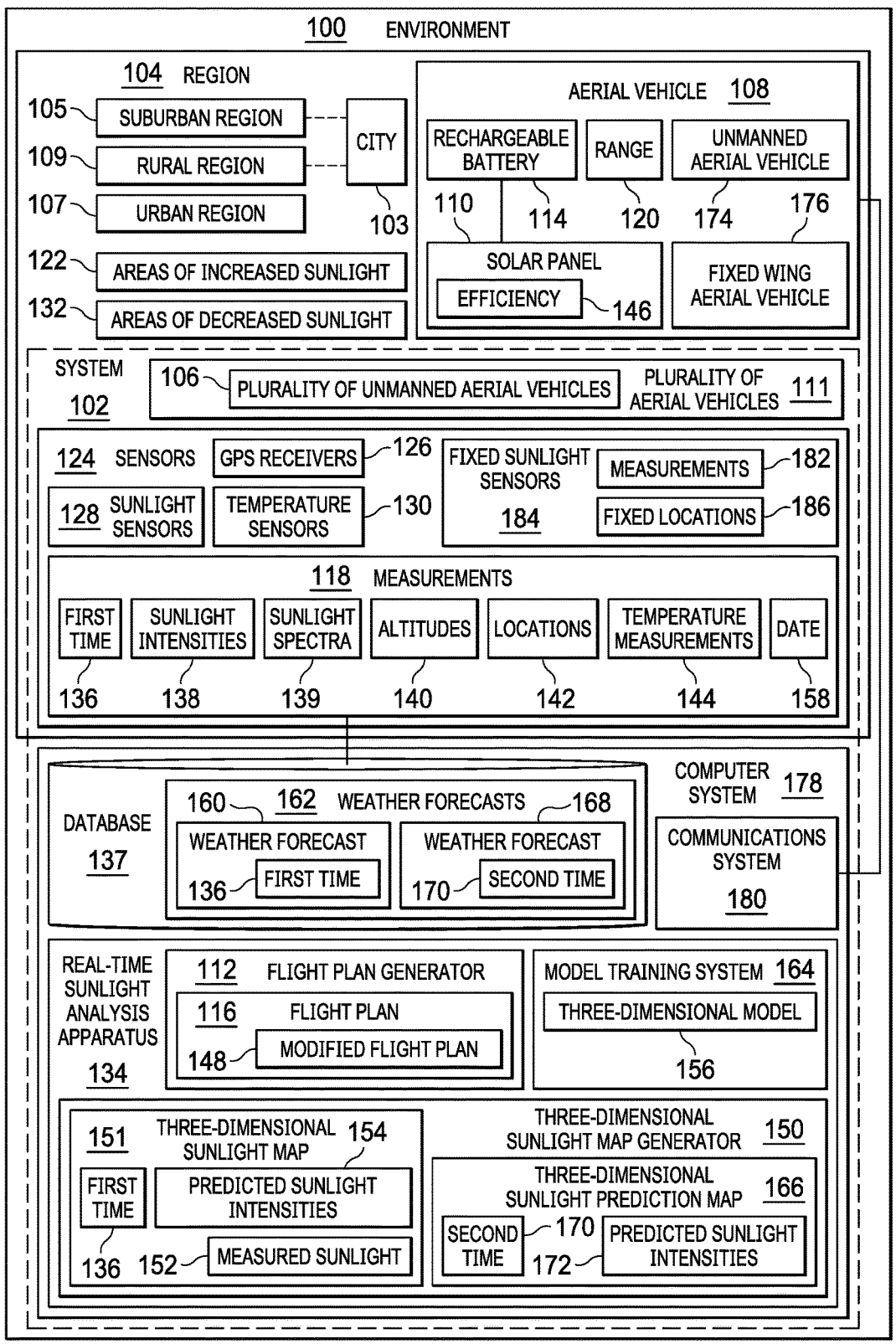
FIG. 1 is an illustration of a block diagram of an environment in which an aerial vehicle flies using a flight plan taking into account sunlight conditions in accordance with an illustrative embodiment.

The illustrative embodiments recognize and take into account one or more different considerations. For example, the illustrative embodiments recognize and take into account that unmanned aerial vehicles are advantageous in several scenarios. The illustrative embodiments recognize and take into account that unmanned aerial vehicles can be used for delivery of packages by a store or vendor. The illustrative embodiments recognize and take into account that unmanned aerial vehicles can be used for delivery of fast food orders. The illustrative embodiments recognize and take into account that unmanned aerial vehicles can be used for transport of human or animal passengers. The illustrative embodiments recognize and take into account that unmanned aerial vehicles can be used for surveillance and/or recognizance.

The illustrative embodiments recognize and take into account that unmanned aerial vehicles are often powered with electric motors. The illustrative embodiments recognize and take into account that unmanned aerial vehicles with electric motors also have rechargeable batteries. The illustrative embodiments recognize and take into account that unmanned aerial vehicles may have attached solar panels to charge batteries. The illustrative embodiments recognize and take into account that solar panels attached to unmanned aerial vehicles may generate electric energy whilst in flight.

The illustrative embodiments recognize and take into account that charging during flight may reduce charging time on the ground. The illustrative embodiments recognize and take into account that reducing charging time on the ground increases the amount of time an unmanned aerial vehicle may be in flight. The illustrative embodiments further recognize and take into account that charging during flight may result in increasing a range of an unmanned aerial vehicle. Increasing the range of an unmanned aerial vehicle may increase at least one of the number of areas that may be serviced by the unmanned aerial vehicle, or the amount of time an unmanned aerial vehicle may be used.

The illustrative embodiments recognize and take into account that unmanned aerial vehicles (UAVs) need to file flight plans. The illustrative embodiments recognize and take into account that flight plans may be created to optimize different functions such as flight time. The illustrative embodiments recognize and take into account that the general cost function used in flight planning may be modified to optimize charging using solar panels. The illustrative embodiments recognize and take into account that creating flight plans that optimize charging using solar panels involves knowledge of sunlight conditions within a region. The illustrative embodiments recognize and take into account that it is desirable to create flight plans that optimize charging potential of UAV and still complete UAV mission.

The illustrative embodiments recognize and take into account that to maximize solar electricity generation, it is desirable to fly a route in which a minimum of obstacles obstruct sunlight to the solar panels. The illustrative embodiments recognize and take into account that sunlight intensity varies by various factors including, but not limited to: weather conditions, lateral location, altitude, ambient temperature, and time of day. The illustrative embodiments recognize and take into account that some conditions are fixed, such as altitude and lateral location. The illustrative embodiments recognize and take into account that some of the conditions are not fixed, such as the weather conditions.

Referring now to the figures and, in particular, with reference to FIG. 1, an illustration of a block diagram of an environment in which an aerial vehicle flies using a flight plan taking into account sunlight conditions is depicted in accordance with an illustrative embodiment. Environment 100 contains system 102 for taking into account sunlight conditions in region 104.

Region 104 is at least one of suburban region 105, urban region 107, or rural region 109. In some illustrative examples, region 104 is city 103. In these illustrative examples, city 103 includes at least one of suburban region 105 or urban region 107.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, "at least one of item A, item B, or item C" may include, without limitation, item A, item A and item B, or item B. This example also may include item A, item B, and item C, or item B and item C. Of course, any combination of these items may be present. In other examples, "at least one of" may be, for example, without limitation, two of item A, one of item B, and ten of item C; four of item B and seven of item C; or other suitable combinations.

System 102 comprises sunlight sensors 128 and GPS receivers 126 within region 104, aerial vehicle 108, solar panel 110, and flight plan generator 112. Each of plurality of unmanned aerial vehicles 106 has a sunlight sensor (not depicted) of sunlight sensors 128 and a GPS receiver (not depicted) of GPS receivers 126. Aerial vehicle 108 is within region 104. Aerial vehicle 108 has rechargeable battery 114. Solar panel 110 is physically connected to aerial vehicle 108 and operably connected to rechargeable battery 114. Flight plan generator 112 is configured to create flight plan 116 within region 104 for aerial vehicle 108 based on measurements 118 from each respective sunlight sensor of sunlight sensors 128. Flight plan 116 is configured to optimize charging of rechargeable battery 114 using solar panel 110.

In some illustrative examples, flight plan 116 is configured to optimize recharging of rechargeable battery 114 on aerial vehicle 108 using solar panel 110 on aerial vehicle 108 and meet one of an objective or a destination for aerial vehicle 108. In some illustrative examples, flight plan 116 is configured to increase range 120 of aerial vehicle 108 using areas of increased sunlight 122 within region 104. Flight plan 116 is created or adjusted to take into account locations of sunlight, such as areas of increased sunlight 122, and characteristics of sunlight, such as intensity, within region 104.

In some illustrative examples, plurality of aerial vehicles 111 are flying within region 104. Each of plurality of aerial vehicles 111 has a sunlight sensor of sunlight sensors 128 and a GPS receiver of GPS receivers 126.

In some illustrative examples, plurality of aerial vehicles 111 takes the form of plurality of unmanned aerial vehicles 106. In these illustrative examples, plurality of unmanned aerial vehicles 106 is within region 104. Each of plurality of unmanned aerial vehicles 106 has a respective sunlight sensor and a respective GPS receiver of sunlight sensors 128 and the GPS receivers 126.

Plurality of unmanned aerial vehicles 106 takes any desirable form. Plurality of unmanned aerial vehicles 106 includes at least one of fixed wing unmanned aerial vehicles or rotocopter unmanned aerial vehicles.

As depicted, region 104 has sensors 124 including GPS receivers 126 and sunlight sensors 128. In some illustrative examples, sensors 124 will include other desirable sensors. In some illustrative examples, sensors 124 also includes temperature sensors 130.

Real-time sunlight analysis apparatus 134 is configured to identify areas of increased sunlight 122 and areas of decreased sunlight 132 within region 104 using measurements 118 from sensors 124. Areas of increased sunlight 122 have greater amounts of sunlight than areas of decreased sunlight 132. Areas of increased sunlight 122 and areas of decreased sunlight 132 change throughout the day. For example, areas of increased sunlight 122 and areas of decreased sunlight 132 change due to the time of day. As another example, areas of increased sunlight 122 and areas of decreased sunlight 132 change due to changes in weather within region 104.

Flight plan generator 112 is configured to create flight plan 116 based on areas of increased sunlight 122 and areas of decreased sunlight 132 identified by real-time sunlight analysis apparatus 134. As used herein, the terms "flight plan" and "flight path," may be used interchangeably.

Flight plan generator 112 is configured to create flight plan 116 that meets a destination (not depicted) or an objective (not depicted) for aerial vehicle 108 while optimizing charging of rechargeable battery 114. For example, when aerial vehicle 108 has a desired destination, flight plan generator 112 creates flight plan 116 to optimize charging of rechargeable battery 114 while flying aerial vehicle 108 to the destination. As another example, when aerial vehicle 108 has an objective, flight plan generator 112 creates flight plan 116 to optimize charging of rechargeable battery 114 while flying aerial vehicle 108 to meet the objective.

Measurements 118 are associated with first time 136. Measurements 118 are obtained using sensors 124. In some illustrative examples, measurements 118 are locally stored. When sensors 124 are present on plurality of unmanned aerial vehicles 106, measurements 118 may be stored on plurality of unmanned aerial vehicles 106. In some illustrative examples, measurements 118 are communicated to and stored within database 137.

In some illustrative examples, areas of increased sunlight 122 and areas of decreased sunlight 132 are directly measured using sensors 124. In some of these illustrative examples, plurality of unmanned aerial vehicles 106 flies through areas of increased sunlight 122 and areas of decreased sunlight 132 with sensors 124. When areas of increased sunlight 122 and areas of decreased sunlight 132 are directly measured using sensors 124, areas of increased sunlight 122 and areas of decreased sunlight 132 are identified directly from measurements 118.

In these illustrative examples, measurements 118 include sunlight intensities 138 within areas of increased sunlight 122 and areas of decreased sunlight 132. In some illustrative examples, measurements 118 include sunlight spectra 139 within areas of increased sunlight 122 and areas of decreased sunlight 132. Different wavelengths of sunlight provide different amounts of energy. Sunlight intensities and sunlight spectra encountered by solar panel 110 affect the amount of power created by solar panel 110.

At least one of sunlight intensities 138 or sunlight spectra 139 are measured using sunlight sensors 128 of sensors 124. Measurements 118 also include altitudes 140 and locations 142. In these illustrative examples, real-time sunlight analysis apparatus 134 associates sunlight intensities 138 with altitudes 140 and locations 142 of sensors 124 to form areas of increased sunlight 122 and areas of decreased sunlight 132. When sunlight spectra 139 are measured, real-time sunlight analysis apparatus 134 associates sunlight spectra 139 with altitudes 140 and locations 142 of to form areas of increased sunlight 122 and areas of decreased sunlight 132. In some illustrative examples, altitudes 140 and locations 142 are determined using GPS receivers 126 in region 104. In some illustrative examples, altitudes 140 and locations 142 are determined using GPS receivers 126 of plurality of unmanned aerial vehicles 106.

In some illustrative examples, measurements 118 include temperature measurements 144. In these illustrative examples, real-time sunlight analysis apparatus 134 uses temperature measurements 144 to estimate efficiency 146 of solar panel 110. Efficiency 146 of power generation by solar panel 110 changes with temperature. Efficiency (not depicted) of charging rechargeable battery 114 changes with temperature. Both efficiency 146 of solar panel 110 and efficiency of charging rechargeable battery 114 decrease with increasing temperature.

In some illustrative examples, it is undesirable to charge rechargeable battery 114 at or below freezing. In some illustrative examples, it is desirable to charge rechargeable battery 114 in the range of 32 degrees Fahrenheit to 113 degrees Fahrenheit. In some illustrative examples, it is most desirable to charge rechargeable battery 114 in the range of 50 degrees Fahrenheit to 85 degrees Fahrenheit. In some illustrative examples, flight plan generator 112 takes into account efficiency 146 of solar panel 110 in creating flight plan 116. In some illustrative examples, flight plan generator 112 takes into account efficiency (not depicted) of rechargeable battery 114 in creating flight plan 116.

In some illustrative examples, flight plan generator 112 may generate new flight plans prior to takeoff. For example, flight plan generator 112 may create flight plan 116 for aerial vehicle 108 prior to takeoff of aerial vehicle 108. In some illustrative examples, flight plan generator 112 may generate modified flight plans during flight of a respective aerial vehicle. For example, flight plan generator 112 may create modified flight plan 148 for aerial vehicle 108 as aerial vehicle 108 flies through region 104. In these illustrative examples, flight plan 116 takes the form of modified flight plan 148.

In some illustrative examples, system 102 further comprises three-dimensional sunlight map generator 150. Three-dimensional sunlight map generator 150 is configured to create three-dimensional sunlight map 151 with measured sunlight 152 and predicted sunlight intensities 154 within region 104. Measured sunlight 152 is representative of measurements 118 from sensors 124. Predicted sunlight intensities 154 are based on three-dimensional model 156 of region 104, a date, and a time. In this illustrative example, three-dimensional sunlight map 151 is created for first time 136. Predicted sunlight intensities 154 are based on three-dimensional model 156 of region 104, date 158, and first time 136.

In some illustrative examples, three-dimensional model 156 of region 104 takes into account the effects of seasonal changes on sunlight intensity for region 104. In some illustrative examples, three-dimensional model 156 of region 104 takes into account the effects of time of day on sunlight intensity.

In some illustrative examples, predicted sunlight intensities 154 are interpolated sunlight intensities at first time 136 for portions of region 104 that do not have direct measurements in measurements 118. In some illustrative examples, predicted sunlight intensities 154 are interpolated using measurements 118, three-dimensional model 156, date 158, and first time 136. In some illustrated examples, predicted sunlight intensities 154 are interpolated using measurements 118, weather forecast 160 for first time 136, three-dimensional model 156, date 158, and first time 136. In these illustrative examples, when measurements 118 include sunlight intensities 138, predicted sunlight intensities 154 are interpolated using sunlight intensities 138. In some illustrative examples, weather forecast 160 for first time 136 is one of weather forecasts 162 saved within database 137.

Information from database 137 is introduced to real-time sunlight analysis apparatus 134. Information from database 137 is used by real-time sunlight analysis apparatus 134 to form three-dimensional sunlight maps, such as three-dimensional sunlight map 151. By forming three-dimensional sunlight maps, real-time sunlight analysis apparatus 134 takes into account that at least one of the intensity of sunlight, spectra of sunlight, or temperature may change with altitude in region 104. For example, structures in region 104 may cast shadows at affect different altitudes for a same latitude/longitude coordinate. In some illustrative examples, shadows may also affect temperature, causing different temperatures at different altitudes for a same latitude/longitude coordinate.

Information from database 137 is used to train three-dimensional model 156 of region 104. For example, measurements 118 at first time 136 and weather forecast 160 at first time 136 may be provided for model training system 164 to train three-dimensional model 156. As another example, measurements 118 at first time 136 with date 158 may be provided for model training system 164 to train three-dimensional model 156. In some illustrative examples, measurements 118 for date 158 are used to train three-dimensional model 156 for seasonal changes to region 104.

In some illustrative examples, model training system 164 is configured to refine and update three-dimensional model 156 of region 104 using additional measurements. For example, model training system 164 is configured to refine and update three-dimensional model 156 of region 104 using measurements from plurality of unmanned aerial vehicles 106 other than measurements 118. For example, model training system 164 is configured to refine and update three-dimensional model 156 of region 104 using measurements from plurality of unmanned aerial vehicles 106 at a time other than first time 136.

Three-dimensional model 156 is a representation of region 104. Three-dimensional model 156 includes any desirable features of region 104. In some illustrative examples, three-dimensional model 156 includes buildings. In some illustrative examples, three-dimensional model 156 includes vegetation. Some features of three-dimensional model 156 may change over time. For example, buildings may be built or removed from region 104 over time. As another example, leaves from trees or other vegetation in region 104 may not be present during the fall and winter months. As yet another example, temporary structures may be erected and then removed within region 104. Three-dimensional model 156 may be generated using radar images, map data, measurements 118 or any other desirable data.

Model training system 164 may make modifications to three-dimensional model 156 based on input from database 137. For example, model training system 164 may modify three-dimensional model 156 based on a weather forecast of weather forecasts 162 and sunlight conditions determined by real-time sunlight analysis apparatus 134 and correlated to that weather forecast. In one example, model training system 164 may modify three-dimensional model 156 based on weather forecast 160 of weather forecasts 162 and areas of increased sunlight 122 and areas of decreased sunlight 132 determined by real-time sunlight analysis apparatus 134 and correlated to weather forecast 160. As another example, model training system 164 may modify three-dimensional model 156 based on measurements 118. Modifications to three-dimensional model 156 take into account changes within region 104, such as any changes to buildings or vegetation present in region 104.

Three-dimensional sunlight map 151 is a map of sunlight conditions at first time 136. Three-dimensional sunlight map 151 may be referred to as a real-time sunlight map.

In some illustrative examples, three-dimensional sunlight map generator 150 is further configured to generate three-dimensional sunlight prediction map 166 for region 104 for a future time using three-dimensional model 156 of region 104, weather forecast 168 for the future time, and the date and time of the future time. In one illustrative example, three-dimensional sunlight map generator 150 is configured to generate three-dimensional sunlight prediction map 166 for region 104 for second time 170 using three-dimensional model 156 and second time 170.

Three-dimensional sunlight prediction map 166 comprises predicted sunlight intensities 172. In some illustrative examples, flight plan generator 112 is configured to create flight plan 116 using three-dimensional sunlight prediction map 166 for region 104 for the future time.

In some illustrative examples, aerial vehicle 108 is flown using flight plan 116 to optimize recharging of rechargeable battery 114 using solar panel 110 and meet one of an objective or a destination for aerial vehicle 108. In some illustrative examples, aerial vehicle 108 is flown using flight plan 116 to increase range 120 of aerial vehicle 108. In some illustrative examples, aerial vehicle 108 is unmanned aerial vehicle 174. In some illustrative examples, unmanned aerial vehicle 174 is one of plurality of unmanned aerial vehicles 106.

Increased surface area for solar panel 110 increases power generated by solar panel 110. In some illustrative examples, aerial vehicle 108 is a fixed wing aerial vehicle. More specifically, in some illustrative examples, aerial vehicle 108 is fixed wing unmanned aerial vehicle 176.

In some illustrative examples, sensors 124 report measured data, including measurements 118, to database 137. In some illustrative examples, sensors 124 communicate with computer system 178 containing database 137 using communications system 180. Other auxiliary information, such as weather forecasts 162, may also be retrieved and transported to database 137.

In some illustrative examples, when sensors 124 are connected to plurality of unmanned aerial vehicles 106, plurality of unmanned aerial vehicles 106 reports measured data, including measurements 118, to database 137. In some illustrative examples, when sensors 124 are connected to plurality of unmanned aerial vehicles 106, plurality of unmanned aerial vehicles 106 communicates with computer system 178 containing database 137 using communications system 180.

Temperature affects efficiency 146 of solar panel 110 and the efficiency of charging rechargeable battery 114. Temperature includes a total temperature, which may be determined using temperature sensors 130 on plurality of unmanned aerial vehicles 106. Temperature includes a static temperature which is a temperature with no velocity effects. In addition to sunlight characteristics measured by sensors 124 within region 104, the GPS information collected using GPS receivers 126 on each data instance's position, heading, and velocity is also transferred. Using measurements 118 and velocity information for a data instance, a total temperature (not depicted) and a static temperature (not depicted) can be determined.

The static temperature may be determined using measurements 118 by first determining a prevalent wind. Given a ground speed collected through GPS receivers 126 or other methods and knowledge of the gyros' effort, a prevalent wind can be calculated. With ground speed and wind speed, the True Air Speed (TAS) of a data instance can be determined through vector addition. The TAS is the velocity utilized in the calculation of the static temperature. The specific heat capacity is a known constant that is also used in calculation of the static temperature.

Measurements 118 and other gathered data is used to benefit aerial vehicle 108. In two different illustrative examples benefitting aerial vehicle 108, either the flight plan is adjusted while aerial vehicle 108 is in flight to form modified flight plan 148 or flight plan 116 is created for aerial vehicle 108 prior to takeoff.

The surrounding area between the position of aerial vehicle 108 and its destination is evaluated for possible routes. All data corresponding to this surrounding area is provided to flight plan generator 112 from database 137. The potentially harness-able electric energy is included in the cost function of flight plan generator 112.

Energy that can be harnessed by solar panel 110 given a temperature, radiant flux density, and sunlight spectrum is determined. In some illustrative examples, flight plan generator 112 evaluates a plurality of flight plans and chooses flight plan 116. To evaluate the plurality of flight plans, each flight plan is divided into sections of consistent sunlight characteristics. Each section of consistent sunlight characteristics may be referred to as an "edge." Edges may change in real time, as sunlight characteristics change in region 104. Energy that can be harnessed by solar panel 110 for each respective edge is determined by multiplying the energy that can be harnessed in the edge by the time that aerial vehicle 108 will travel in the respective edge. This process is repeated for all edges. The sum of all energy that can be harnessed using all edges of a respective flight path represents the cost savings of that flight path for aerial vehicle 108.

To create flight plan 116, flight plan generator 112 takes into account the cost benefit of harnessing solar energy. Flight plan generator 112 determines the cost benefit of harnessing solar energy and chooses a route with a least cost for aerial vehicle 108. The route with the least cost is flight plan 116.

Real-time sunlight analysis apparatus 134 may be implemented in at least one of hardware or software. As depicted, real-time sunlight analysis apparatus 134 is implemented in computer system 178. As depicted, computer system 178 is not present within region 104. However, in other illustrative examples, computer system 178 may be present within region 104.

System 102 includes communications system 180 configured to communicate with plurality of unmanned aerial vehicles 106. Communications system 180 communicates flight plan 116 with aerial vehicle 108

The illustration of environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, real-time sunlight analysis apparatus 134 may receive additional measurements from other equipment or structures than plurality of unmanned aerial vehicles 106. In some illustrative examples, real-time sunlight analysis apparatus 134 receives measurements 182 from fixed sunlight sensors 184. In these illustrative examples, real-time sunlight analysis apparatus 134 is configured to determine areas of increased sunlight 122 and areas of decreased sunlight 132 within region 104 using measurements 118 from plurality of unmanned aerial vehicles 106 and measurements 182 from fixed sunlight sensors 184.

When fixed sunlight sensors 184 are present in region 104, fixed sunlight sensors 184 are positioned at fixed locations 186 within region 104. In some illustrative examples, flight plan generator 112 is further configured to create flight plan 116 based on measurements 182 from fixed sunlight sensors 184.

As another example, three-dimensional sunlight map 151 may not include predicted sunlight intensities 154. In some illustrative examples, three-dimensional sunlight map 151 may only include measured sunlight 152 for first time 136. Although not depicted in FIG. 1, measurements 118 may further include radiant flux density, sunlight spectrum.

As yet another example, when aerial vehicle 108 is flying within rural region 109, sensors 124 may not be present. In illustrative examples when aerial vehicle 108 is flying within rural region 109, aerial vehicle 108 may carry the only sensors in rural region 109. When aerial vehicle 108 is flying within rural region 109, measurements 118 from sensors 124 may not be used to form flight plan 116. Although this illustrative example is described as occurring in rural region 109, aerial vehicle 108 may carry the only sensors operating in any type of region, including suburban region 105 or rural region 109.

In illustrative examples when aerial vehicle 108 is flying within rural region 109, aerial vehicle 108 may be the only aerial vehicle within region 104. In these illustrative examples, flight plan 116 for aerial vehicle 108 may be formed taking into account measurements from aerial vehicle 108. For example, three-dimensional model 156 used to generate flight plan 116 may be formed using measurements from aerial vehicle 108. Although this illustrative example is described as occurring in rural region 109, aerial vehicle 108 may be the only aerial vehicle operating in any type of region, including suburban region 105 or rural region 109.

Figure 2:
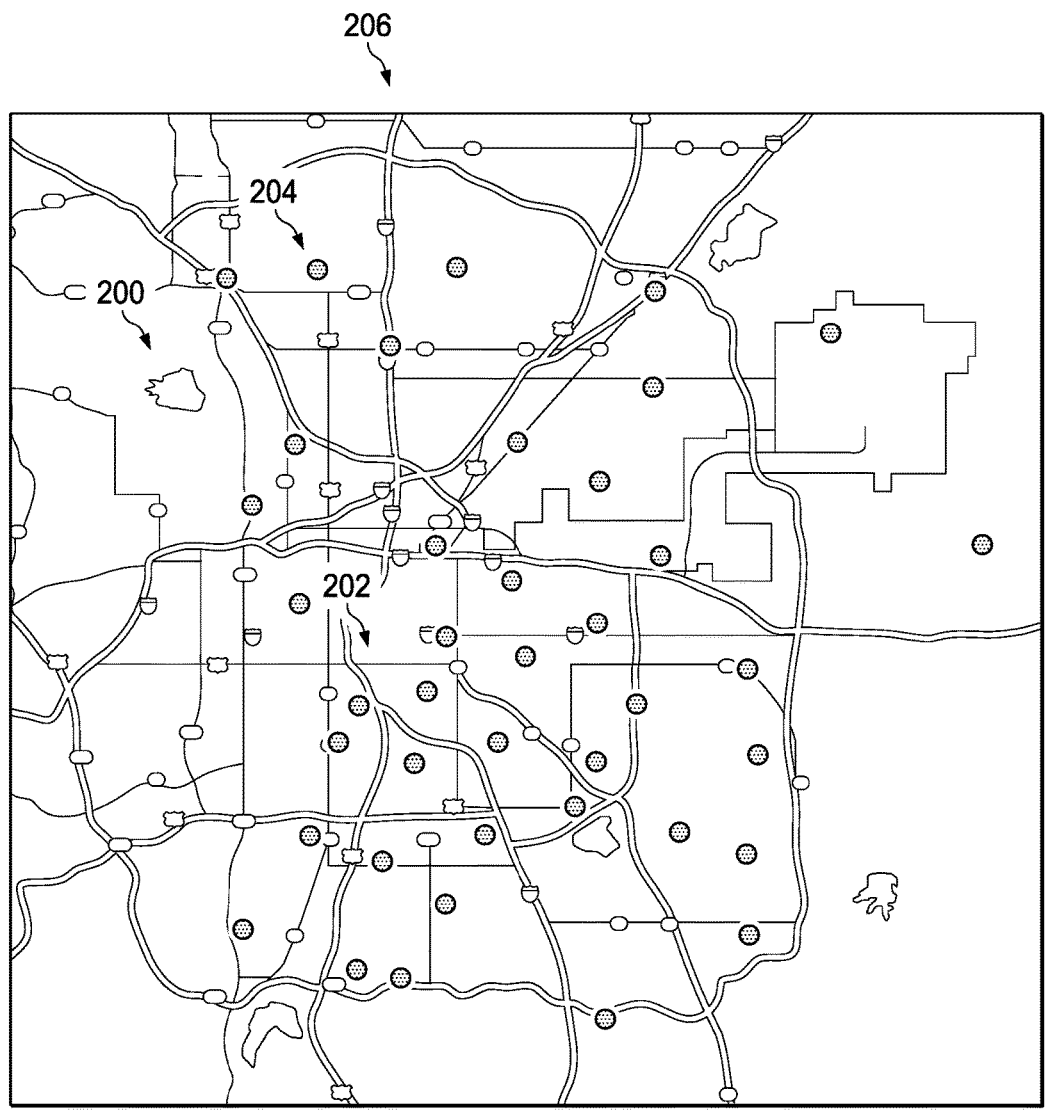
FIG. 2 is an illustration of a two-dimensional view of locations for a plurality of unmanned aerial vehicles identified in a region in accordance with an illustrative embodiment.

Turning now to FIG. 2, an illustration of a two-dimensional view of locations for sensors within in a region is depicted in accordance with an illustrative embodiment. Region 200 is a physical implementation of region 104 of FIG. 1. As depicted, region 200 includes at least one of a suburban region or an urban region. As depicted, region 200 includes city 202.

Assuming an operator of an unmanned aerial vehicle wants to deliver parcels to homes in city 202 within region 200, the operator would like to know sunlight conditions within city 202. Using the sunlight conditions within city 202, the operator may plan more desirable flight routes. For example, using sunlight intensities within city 202, the operator may plan flight plans to increase the range of the unmanned aerial vehicle. As another example, using sunlight conditions within city 202, the operator may plan flight plans to increase solar charging of batteries for the unmanned aerial vehicle. Using sunlight conditions within city 202, the operator may plan or request flight plan 116 to optimize recharging of rechargeable battery 114 using solar panel 110 and meet one of an objective or a destination for aerial vehicle 108. As yet another example, using sunlight conditions within the city, the operator may plan flight plans with reduced flight time.

In some illustrative examples, the operator may plan flight plans using flight plan generator 112 of FIG. 1. In some illustrative examples, the operator may provide values for a cost function for flight plan generator 112 of FIG. 1. In some illustrative examples, an operator may select from flight plans created by flight plan generator 112 of FIG. 1.

As depicted, plurality of points 204 is present within region 200. Plurality of points 204 represents positions of sensors within region 200. Plurality of points 204 may be physical representations of locations 142 of sensors 124 in region 104 of FIG. 1. Plurality of points 204 includes at least one of positions of fixed sunlight sensors or positions of aerial vehicles. In some illustrative examples, plurality of points 204 includes positions of unmanned aerial vehicles flying within region 200. In these illustrative examples, the unmanned aerial vehicles are physical implementations of unmanned aerial vehicles 106 of FIG. 1. Although plurality of points 204 is depicted in a two-dimensional setting, in a three-dimensional setting, plurality of points 204 also includes an altitude for sensor of the sensors.

View 206 of region 200 is a snapshot view at a first time, such as first time 136 of FIG. 1. At least some of plurality of points 204 may be positioned at different locations within region 200 at a second time (not depicted). For example, when plurality of points 204 includes positions of aerial vehicles flying within region 200, the positions of the aerial vehicles will be positioned at different locations within region 200 at a second time (not depicted).

In some illustrative examples, view 206 is an exemplary presence of unmanned aerial vehicles employed by a company using large numbers of unmanned aerial vehicles for operations. In these illustrative examples, unmanned aerial vehicles may be employed by a company delivering cargo in a city. In some illustrative examples, view 206 is an exemplary presence of unmanned aerial vehicles employed by several operators. In these illustrative examples, the multiple operators may pool their resources to collect and predict sunlight conditions within region 200. The multiple operators may include any desirable type of operator, including companies or individuals.

Due to the quantity of sensors within region 200, including unmanned aerial vehicles operating within region 200, a good coverage of region 200 can be generated. Sensors represented by plurality of points 204 create measurements for determining sunlight conditions within region 200.

Sunlight conditions may be defined in the context of factors correlating with the output amount of generated electric power. In some illustrative examples, the factors include ambient temperature around the solar panel. The ambient temperature may be the total temperature, due to movement of the unmanned aerial vehicle and a subsequently higher heat flux from the unmanned aerial vehicle to the air around it. As described above, the total temperature may be determined directly from temperature sensors, such as temperature sensors 130 of FIG. 1.

Energy that can be harnessed by a solar panel is affected by temperature, radiant flux density, and sunlight spectrum. The radiant flux density may also be referred to as sunlight intensity. In some illustrative examples, the factors include radiant flux density at a given time and location/altitude. In some illustrative examples, the factors include a sunlight spectrum prevalent at the given location/altitude. The sunlight spectrum is a function of the air mass between the unmanned aerial vehicle and the sun, i.e. a function of the angle of the sun across the sky. The sunlight spectrum may also change based on other factors, such as the presence of clouds, or the current season.

The sunlight spectrum at a location and an altitude can be measured while in flight. In some illustrative examples, the sunlight spectrum may be determined using one or more sensors, such as sunlight sensors 128 of FIG. 1, on board an unmanned aerial vehicle (UAV). Data captured on these factors can be measured the entire time an unmanned aerial vehicle (UAV) is in the air, across an entire UAV fleet, as depicted in FIG. 2.

In some illustrative examples, in-flight measurements are bolstered by other information sources, such as, but not limited to: ground-based sensors capturing sunlight intensity, and temperature and radar images to retrieve information on cloud coverage. Sunlight spectra can be calculated based on the angle of the sun or can be retrieved through meteorological services.

Figure 3:
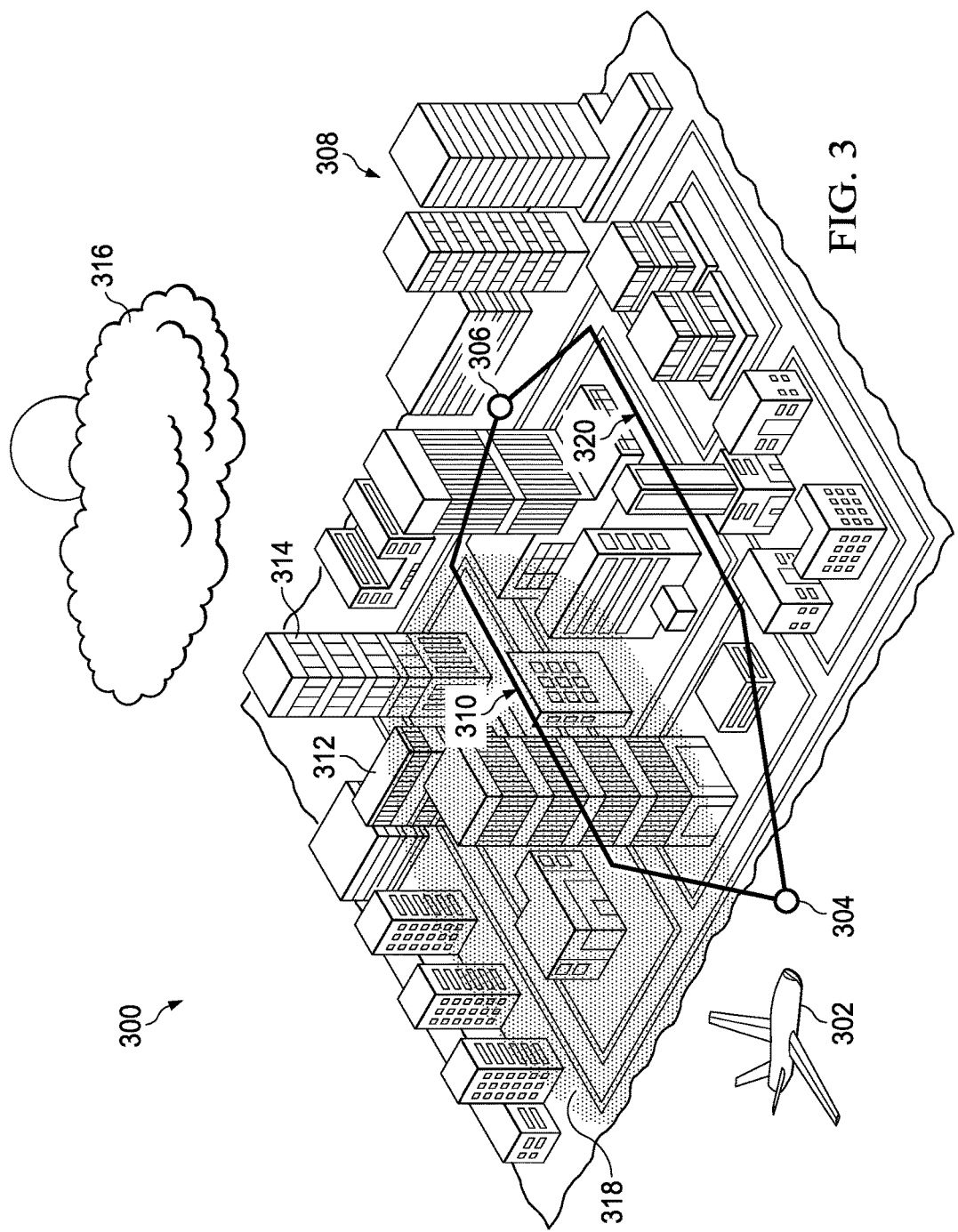
FIG. 3 is an illustration of an isometric view of an unmanned aerial vehicle flying through an urban region in accordance with an illustrative embodiment.

Turning now to FIG. 3, an illustration of an isometric view of an unmanned aerial vehicle flying through an urban region is depicted in accordance with an illustrative embodiment. Urban region 300 is a physical implementation of urban region 107 of FIG. 1. Unmanned aerial vehicle 302 is a physical implementation of aerial vehicle 108 of FIG. 1. More specifically, unmanned aerial vehicle 302 is a physical implementation of unmanned aerial vehicle 174 of FIG. 1.

Unmanned aerial vehicle 302 has desired departure point 304 and destination 306. Each unmanned aerial vehicle (UAV) mission for unmanned aerial vehicle 302 is faced with a choice of routes to fly. With respect to the factor of sunlight, this is assumed to vary. Two exemplary routes are depicted in urban region 300, with one crossing an area with favorable and one with less favorable sunlight conditions.

Urban region 300 includes buildings 308. Unmanned aerial vehicle 302 may follow flight path 310 from departure point 304 to destination 306. Flight path 310 may be selected based on any desirable flight characteristics, such as shortest projected flight length, or shortest projected flight time. In some illustrative examples, flight path 310 may not increase the range of unmanned aerial vehicle 302.

Dependent on time and date, buildings 308 may block sunlight to portions of flight path 310. For example, building 312 and building 314 may cast shadows (not depicted) upon portions of flight path 310 dependent on sun location relative to urban region 300.

Dependent on the weather, cloud cover may cover portions of flight path 310. As depicted, clouds 316 are present within urban region 300. As depicted, clouds 316 cast shadow 318 onto flight path 310. As depicted, flight path 310 has less favorable sunlight conditions than flight path 320. For example, sunlight intensity along flight path 310 is less than sunlight intensity along flight path 320.

Flight path 320 does not currently have cloud cover. Further, flight path 320 currently does not have shadows due to buildings 308.

In some illustrative examples, flight path 320 within urban region 300 for unmanned aerial vehicle 302 is based on measurements from each respective sunlight sensor of a plurality of unmanned aerial vehicles, such as plurality of unmanned aerial vehicles 106 of FIG. 1. In some illustrative examples, flight path 320 is configured to increase the range of unmanned aerial vehicle 302 using areas of increased sunlight within urban region 300.

When unmanned aerial vehicle 302 follows flight path 320, a solar panel (not depicted) on unmanned aerial vehicle 302 charges a battery of unmanned aerial vehicle 302. When unmanned aerial vehicle 302 follows flight path 320, the sunlight along flight path 320 increases the range of unmanned aerial vehicle 302. When unmanned aerial vehicle 302 follows flight path 320, the sunlight along flight path 320 decreases the recharge time for the battery of unmanned aerial vehicle 302.

Although FIG. 3 is described as containing unmanned aerial vehicle 302, any desirable type of aerial vehicle may fly within urban region 300.

Figure 4:
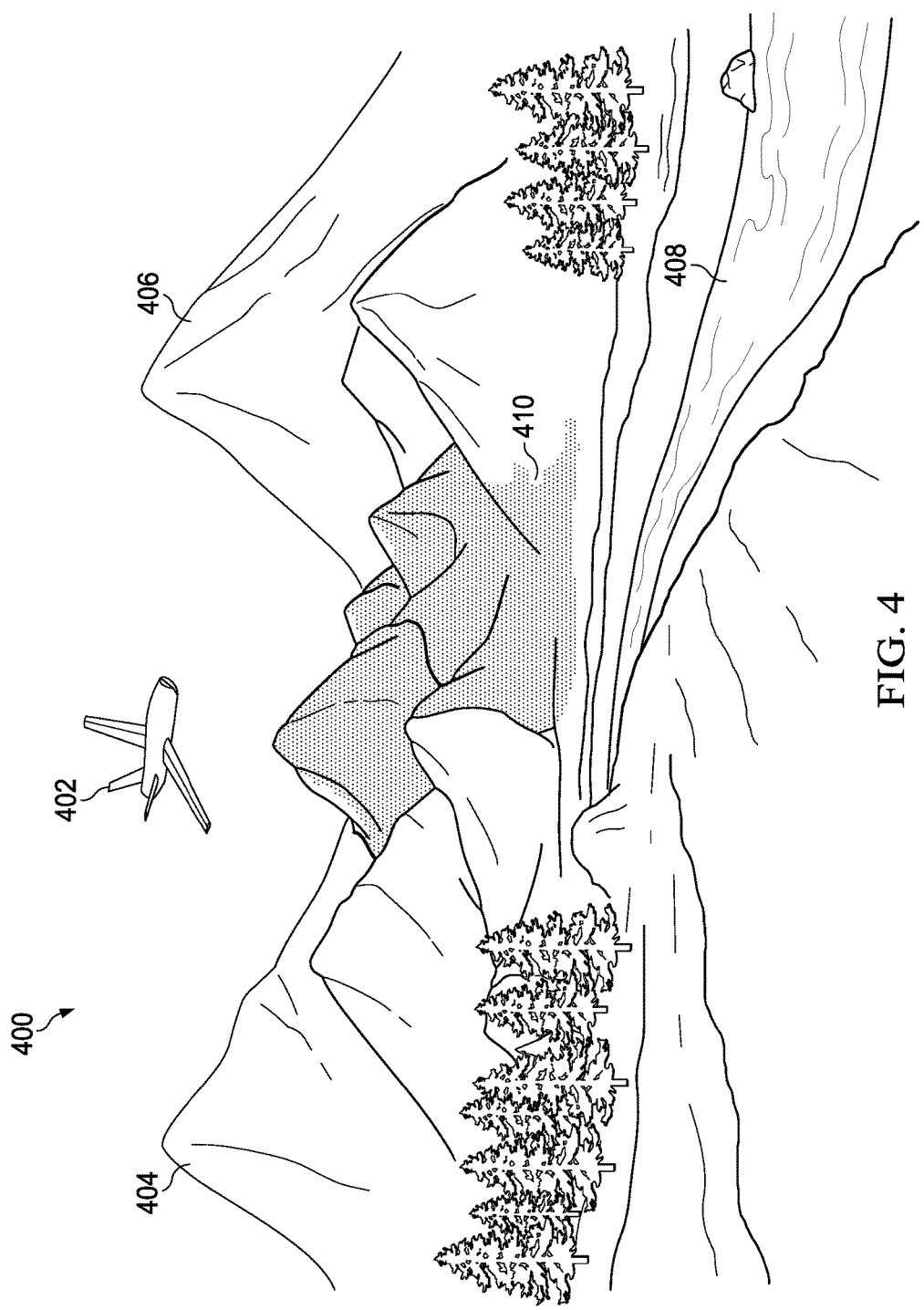
FIG. 4 is an illustration of an isometric view of flight plans for an unmanned aerial vehicle flying through a rural region in accordance with an illustrative embodiment.

Turning now to FIG. 4, an illustration of an isometric view of flight plans for an unmanned aerial vehicle flying through a rural region is depicted in accordance with an illustrative embodiment. Rural region 400 is a physical implementation of rural region 109 of FIG. 1. Unmanned aerial vehicle 402 is a physical implementation of aerial vehicle 108 of FIG. 1. More specifically, unmanned aerial vehicle 402 is a physical implementation of unmanned aerial vehicle 174 of FIG. 1.

Rural region 400 includes mountain 404, mountain 406, and river 408. As depicted, mountain 404 is casting shadow 410 in view 412. Shadow 410 may be predicted based on a date and time for view 412.

In some illustrative examples, shadow 410 is predicted based on measurements taken by unmanned aerial vehicle 402. In some illustrative examples, shadow 410 is predicted based on measurements taken by unmanned aerial vehicle 402 at the time during view 412. In some illustrative examples, shadow 410 is predicted based on previous measurements taken by unmanned aerial vehicle 402 at previous times. In some illustrative examples, shadow 410 is predicted based on measurements taken by other unmanned aerial vehicles.

In some illustrative examples, shadow 410 may be predicted using a three-dimensional model, such as three-dimensional model 156 of FIG. 1. A three-dimensional model may include representations of mountain 404, mountain 406, and river 408. In some illustrative examples, shadow 410 may be predicted using a three-dimensional model created using measurements from one or more unmanned aerial vehicles. As mountain 404 and mountain 406 are fixed, shadow 410 can be calculated for rural region 400 based upon time of day and time of the year.

In some illustrative examples, a flight path for unmanned aerial vehicle 402 is created taking into account shadow 410. For example, a flight path for unmanned aerial vehicle 402 may be created to avoid entering shadow 410. In some illustrative examples, a flight path for unmanned aerial vehicle 402 is configured to increase the range of unmanned aerial vehicle 402 using areas of increased sunlight within rural region 400. Although FIG. 4 is described as containing unmanned aerial vehicle 402, any desirable type of aerial vehicle may fly within rural region 400.

The different components shown in FIGS. 2-4 may be combined with components in FIG. 1, used with components in FIG. 1, or a combination of the two. Additionally, some of the components in FIGS. 2-4 may be illustrative examples of how components shown in block form in FIG. 1 can be implemented as physical structures.

Figure 5:
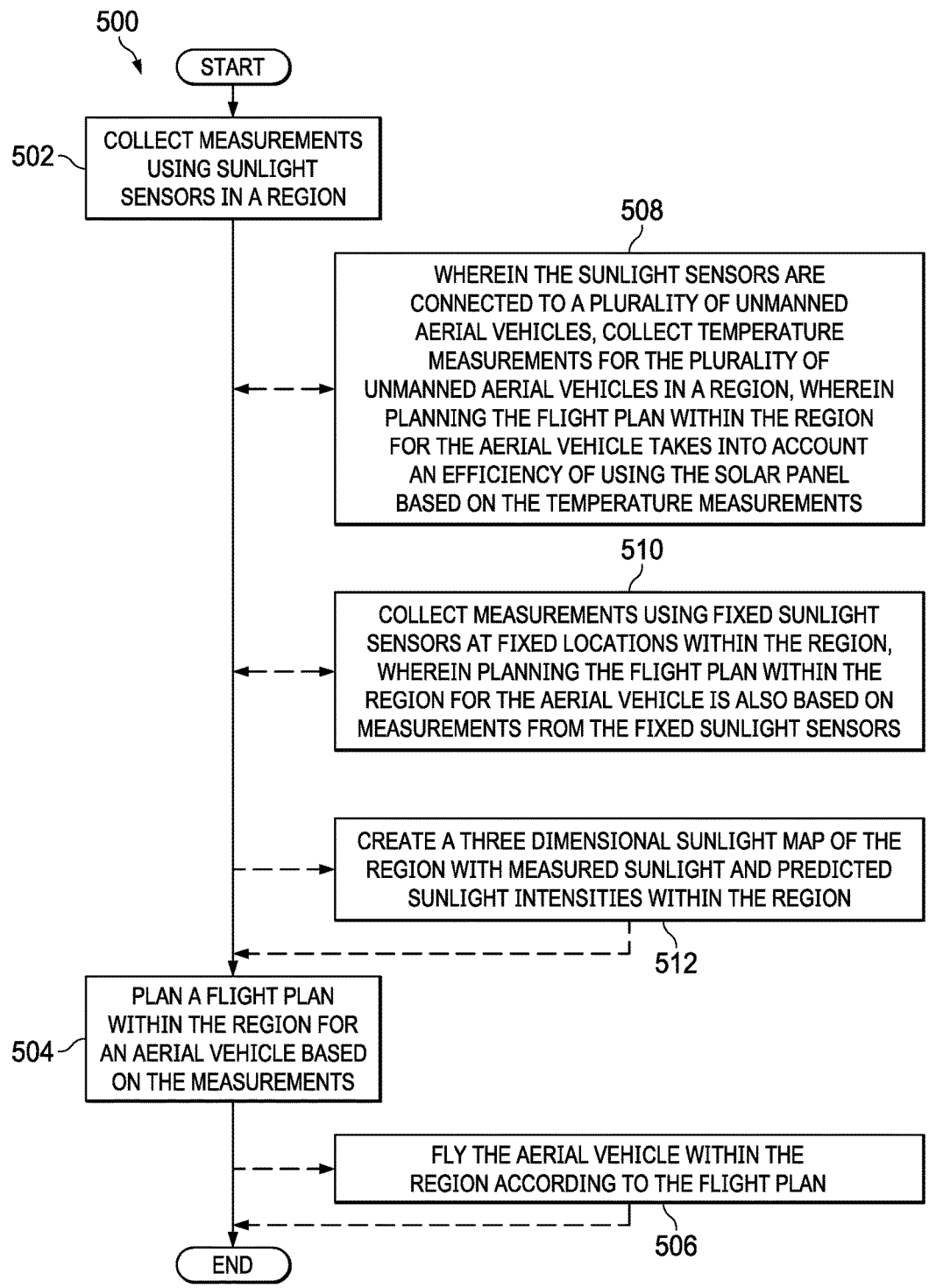
FIG. 5 is an illustration of a flowchart of a method for flying an aerial vehicle in a region in accordance with an illustrative embodiment.

Turning now to FIG. 5, an illustration of a flowchart of a method for flying an aerial vehicle in a region is depicted in accordance with an illustrative embodiment. Method 500 may be implemented using system 102 of FIG. 1. Portions of method 500 may be implemented using plurality of unmanned aerial vehicles represented by plurality of points 204 of FIG. 2. Method 500 may be used in urban region 300 of FIG. 3. Method 500 may be used to plan flight path 320 of FIG. 3. Method 500 may be used in rural region 400 of FIG. 4. Method 500 may be used to plan a path within rural region 400 of FIG. 4.

Method 500 collects measurements using sunlight sensors in a region (operation 502). The region is at least one of a rural region, a suburban region, or an urban region. Method 500 plans a flight plan within the region for an aerial vehicle based on the measurements (operation 504). Afterwards, the method terminates.

In some illustrative examples, the flight plan is configured to recharge a rechargeable battery on the aerial vehicle using a solar panel on the vehicle and meet one of an objective or a destination for the aerial vehicle. In some illustrative examples, the aerial vehicle has a rechargeable battery and a solar panel physically connected to the aerial vehicle, in which the solar panel is operably connected to the rechargeable battery. In some illustrative examples, method 500 flies the aerial vehicle within the region according to the flight plan. In some illustrative examples, method 500 flies the aerial vehicle within the region according to the flight plan to optimize recharging of the rechargeable battery using the solar panel and meet one of an objective or a destination for the aerial vehicle. In some illustrative examples, method 500 flies the aerial vehicle within the region according to the flight plan to increase the range of the aerial vehicle using areas of increased sunlight within the region. In some illustrative examples, the aerial vehicle is an unmanned aerial vehicle.

In some illustrative examples, the sunlight sensors are connected to a plurality of unmanned aerial vehicles. In some illustrative examples, method 500 collects temperature measurements for the plurality of unmanned aerial vehicles in a region, wherein planning the flight plan within the region for the aerial vehicle takes into account an efficiency of using the solar panel based on the temperature measurements (operation 508).

In some illustrative examples, method 500 collects measurements using fixed sunlight sensors at fixed locations within the region, wherein planning the flight plan within the region for the aerial vehicle is also based on measurements from the fixed sunlight sensors (operation 510).

In some illustrative examples, method 500 creates a three-dimensional sunlight map of the region with measured sunlight and predicted sunlight intensities within the region (operation 512). In some illustrative examples, the predicted sunlight intensities are based on a three-dimensional model of the region and a date and time. In some illustrative examples, the predicted sunlight intensities are further based on a weather forecast.

Figure 6:
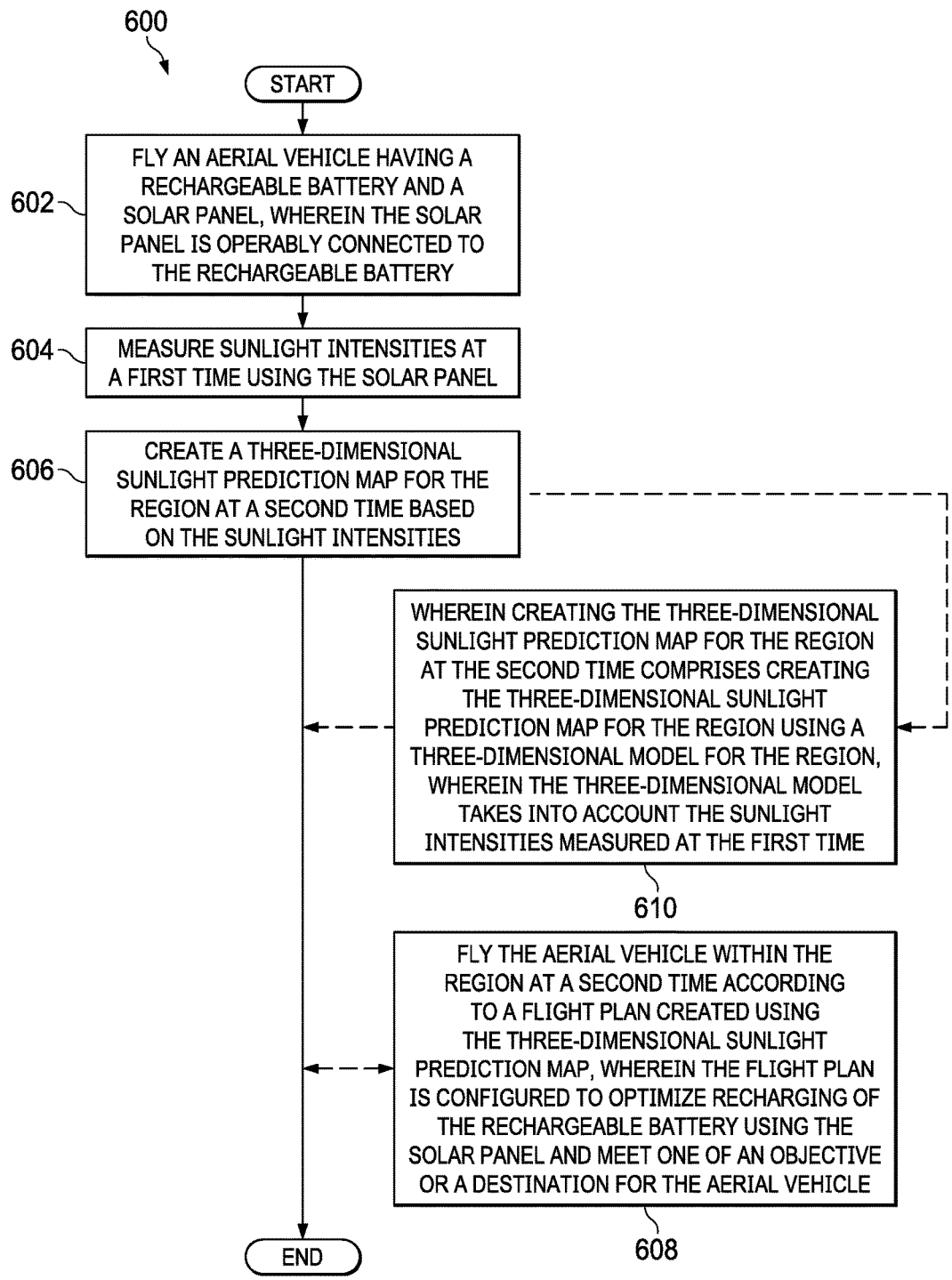
FIG. 6 is an illustration of a flowchart of a method for flying an aerial vehicle in a region in accordance with an illustrative embodiment.

Turning now to FIG. 6, an illustration of a flowchart of a method for flying an aerial vehicle in a region is depicted in accordance with an illustrative embodiment. Method 600 may be implemented using system 102 of FIG. 1. Method 600 may be used in urban region 300 of FIG. 3. Method 600 may be used to plan flight path 320 of FIG. 3. Method 600 may be used in rural region 400 of FIG. 4. Method 600 may be used to plan a path in rural region 400 of FIG. 4.

Method 600 flies an aerial vehicle having a rechargeable battery and a solar panel, wherein the solar panel is operably connected to the rechargeable battery (operation 602). In some illustrative examples, the aerial vehicle is an unmanned aerial vehicle.

Method 600 measures sunlight intensities at a first time using the solar panel (operation 604). Method 600 creates a three-dimensional sunlight prediction map for the region at a second time based on the sunlight intensities (operation 606). In some illustrative examples, method 600 creates three-dimensional sunlight prediction map for the region at the second time taking into account the sunlight intensities and other input. In some examples, this input may take the form of additional sunlight intensities from other aerial vehicles. In some examples, this input may take the form of additional sunlight intensities at different times from the aerial vehicle. In some examples, this input may take the form of a three-dimensional model created over time using sunlight intensities at different times and at different locations in the region from the aerial vehicle.

Method 600 flies the aerial vehicle within the region at a second time according to a flight plan created using the three-dimensional sunlight prediction map, wherein the flight plan is configured to increase the range of the aerial vehicle using areas of increased sunlight within the region (operation 608). Afterwards, the method terminates.

In some illustrative examples, method 600 creates the three-dimensional sunlight prediction map for the region at the second time comprises creating the three-dimensional sunlight prediction map for the region using a three-dimensional model for the region, wherein the three-dimensional model takes into account the sunlight intensities measured at the first time (operation 610). In some illustrative examples, the three-dimensional model for the region takes into account maps or other geographical input. In some illustrative examples, the three-dimensional model for the region takes into account additional sunlight intensities from the aerial vehicle at different times and at different locations in the region. In some illustrative examples, the three-dimensional model for the region takes into account sunlight intensities from additional aerial vehicles operating in the region. In some illustrative examples, the three-dimensional model takes into account at least one of a sunrise time associated with the second time, a sunset time associated with the second time, or a season associated with the second time.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added, in addition to the illustrated blocks, in a flowchart or block diagram.

In some illustrative examples, not all blocks of method 500 are performed. For example, each of operation 508 and operation 510 may not be performed.

The illustrative examples provide a system and method for taking into account available sunlight within a region for providing power to aerial vehicles. The illustrative examples optimize flight trajectories depending on the amount of energy aerial vehicles are able to capture along their planned mission. In some illustrative examples, the aerial vehicles take the form of unmanned aerial vehicles (UAVs).

The system comprises a number of components on unmanned aerial vehicles (UAVs): sensors on board the UAV to measure radiant flux density, temperature and the sun light spectrum and a means to transmit sensed data to a central entity. The central entity need not be a single physical computer system in the region. In some illustrative examples, the central entity may be a data-gathering cloud. In real-time, UAVs in the air transmit data on desirable metrics, creating an in-air map of current sunlight conditions. In addition to the unmanned aerial vehicles, ground stations and meteorological measurements/data can also be harnessed to further increase the number of data measurement points.

Aerial vehicles using flight trajectories taking into account the current sunlight conditions also include solar panels attached to the aerial vehicles for harnessing the sunlight. In some illustrative examples, a number of unmanned aerial vehicles that were used for data collection may also be charged using solar panels. In other illustrative examples, none of the unmanned aerial vehicles used for data collection are charged.

The illustrative examples may be utilized in two primary ways. First, aerial vehicles currently in-flight benefit from the knowledge on sunlight distribution, with their trajectories potentially optimized to maximize power harnessing. Second, knowledge of sunlight conditions can be used for planning future flight plans, so that the added benefit of harnessing electricity is incorporated into the cost function, providing a means of assessing potential cost savings (due to less charging necessary) and added revenue (as the aerial vehicle can potentially fly a greater distance).

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system comprising:
sunlight sensors and GPS receivers within a region;
an aerial vehicle within the region, the aerial vehicle having a rechargeable battery;
a solar panel physically connected to the aerial vehicle and operably connected to the rechargeable battery; and
a flight plan generator configured to create a flight plan within the region for the aerial vehicle based on measurements from the sunlight sensors within the region and a three-dimensional sunlight map.

2. The system of claim 1 further comprising:
a plurality of unmanned aerial vehicles within the region, wherein each of the plurality of unmanned aerial vehicles has a respective sunlight sensor and a respective GPS receiver of the sunlight sensors and the GPS receivers.

3. The system of claim 1, wherein the flight plan is configured to optimize recharging of the rechargeable battery using the solar panel and meet one of an objective or a destination for the aerial vehicle.

4. The system of claim 1, wherein the sunlight sensors comprise fixed sunlight sensors at fixed locations within the region, wherein the flight plan generator is configured to create the flight plan based on measurements from the fixed sunlight sensors.

5. The system of claim 1 further comprising:
a three-dimensional sunlight map generator configured to create the three-dimensional sunlight map with:
measured sunlight within the region; and
a plurality of predicted sunlight intensities within the region.

6. The system of claim 5, wherein the plurality of predicted sunlight intensities is based on a three-dimensional model of the region and a date and a time.

7. The system of claim 5, wherein the three-dimensional sunlight map generator is further configured to generate a three-dimensional sunlight prediction map for the region for a future time using a three-dimensional model of the region, a weather forecast for the future time, and a date and time of the future time.

8. The system of claim 7, wherein the flight plan generator is configured to create the flight plan using the three-dimensional sunlight prediction map for the region for the future time.

9. The system of claim 1 further comprising:
a model training system configured to refine and update, using additional measurements, a three-dimensional model of the region.

10. The system of claim 1 further comprising:
a communications system configured to communicate with a plurality of unmanned aerial vehicles.

11. The system of claim 1, wherein the aerial vehicle is an unmanned aerial vehicle.

12. The system of claim 1, wherein the aerial vehicle is a fixed wing aerial vehicle.

13. A method comprising:
collecting measurements using sunlight sensors in a region;
creating a three-dimensional sunlight map of the region based on the measurements; and
planning a flight plan within the region for an aerial vehicle, wherein the flight plan is based on the three-dimensional sunlight map.

14. The method of claim 13, wherein the flight plan is configured to optimize recharging of a rechargeable battery on the aerial vehicle using a solar panel on the aerial vehicle and meet one of an objective or a destination for the aerial vehicle.

15. The method of claim 13 in which the aerial vehicle has a rechargeable battery and a solar panel physically connected to the aerial vehicle, in which the solar panel is operably connected to the rechargeable battery.

16. The method of claim 13 further comprising:
flying the aerial vehicle within the region according to the flight plan.

17. The method of claim 13 wherein the sunlight sensors are connected to a plurality of unmanned aerial vehicles.

18. The method of claim 17 further comprising:
collecting temperature measurements for the plurality of unmanned aerial vehicles in the region, wherein planning the flight plan within the region for the aerial vehicle takes into account an efficiency of using a solar panel based on the temperature measurements.

19. The method of claim 17 further comprising:
collecting measurements using fixed sunlight sensors at fixed locations within the region, wherein planning the flight plan within the region for the aerial vehicle is also based on measurements from the fixed sunlight sensors.

20. The method of claim 13, wherein the aerial vehicle is an unmanned aerial vehicle.

21. The method of claim 13, wherein the region is at least one of a rural region, a suburban region, or an urban region.

22. The method of claim 13, wherein the three-dimensional sunlight map of the region is created with:
measured sunlight within the region; and
a plurality of predicted sunlight intensities within the region.

23. The method of claim 22, wherein the plurality of predicted sunlight intensities is based on a three-dimensional model of the region and a date and a time.

24. The method of claim 23, wherein the plurality of predicted sunlight intensities is further based on a weather forecast.

25. A method comprising:
flying an aerial vehicle having a rechargeable battery and a solar panel, wherein the solar panel is operably connected to the rechargeable battery;
measuring sunlight intensities at a first time using the solar panel; and
creating a three-dimensional sunlight prediction map for a region at a second time based on the sunlight intensities.

26. The method of claim 25, further comprising:
flying the aerial vehicle within the region at a third time according to a flight plan created using the three-dimensional sunlight prediction map, wherein the flight plan is configured to optimize recharging of the rechargeable battery using the solar panel and meet one of an objective or a destination for the aerial vehicle.

27. The method of claim 25, wherein the aerial vehicle is an unmanned aerial vehicle.

28. The method of claim 25, wherein creating the three-dimensional sunlight prediction map for the region at the second time comprises creating the three-dimensional sunlight prediction map for the region using a three-dimensional model for the region, wherein the three-dimensional model takes into account the sunlight intensities measured at the first time.

29. The method of claim 28, wherein the three-dimensional model takes into account at least one of a sunrise time associated with the second time, a sunset time associated with the second time, or a season associated with the second time.

* * * * *